US012732057B2

(12) United States Patent
Shouda et al.

(10) Patent No.: US 12,732,057 B2
(45) Date of Patent: Sep. 8, 2026

(54) COOLING STRUCTURE

(71) Applicant: Showa Denko Materials Co., Ltd., Tokyo (JP)

(72) Inventors: Hiroaki Shouda, Tagawa (JP); Takahiro Yamashita, Tagawa (JP); Kazutake Fujisawa, Tagawa (JP)

(73) Assignee: RESONAC CORPORATION, Tokyo (JP)

( * ) Notice: Subject to any disclaimer, the term of this patent is extended or adjusted under 35 U.S.C. 154(b) by 373 days.

(21) Appl. No.: 17/440,554

(22) PCT Filed: Mar. 19, 2020

(86) PCT No.: PCT/JP2020/012486
§ 371 (c)(1),
(2) Date: Sep. 17, 2021

(87) PCT Pub. No.: WO2020/196334
PCT Pub. Date: Oct. 1, 2020

(65) Prior Publication Data

US 2022/0149692 A1 May 12, 2022

(30) Foreign Application Priority Data

Mar. 22, 2019 (JP) ................................ 2019-055695

(51) Int. Cl.
*H02K 5/20* (2006.01)
*F15D 1/02* (2006.01)
*H02K 11/01* (2016.01)

(52) U.S. Cl.
CPC ............ *H02K 5/203* (2021.01); *F15D 1/025* (2013.01); *H02K 11/0141* (2020.08)

(58) Field of Classification Search
CPC ...... H02K 11/0141; F28D 7/1661; F28F 1/04; F28F 1/422; F28F 9/24
See application file for complete search history.

(56) References Cited

U.S. PATENT DOCUMENTS 4,593,757 A * 6/1986 McClintock .......... F28F 9/0132 165/162
7,167,363 B1 * 1/2007 Cushman ........... H05K 7/20145 361/692

(Continued)

FOREIGN PATENT DOCUMENTS

EP 0462552 A1 * 12/1991
JP S60-72252 A 4/1985

(Continued)

OTHER PUBLICATIONS

EP-0462552-A1 Translation (Year: 1991).*

*Primary Examiner* — David J Teitelbaum
(74) *Attorney, Agent, or Firm* — FITCH, EVEN, TABIN & FLANNERY, LLP

(57) ABSTRACT

A cooling structure includes a flow path configuration member including resin and forming a flow path through which a refrigerant flows, in which the flow path includes a protrusion that protrudes in a direction outside of the flow path from an inner wall at an upstream side in a direction in which the refrigerant flows, and a rectifier that rectifies the direction in which the refrigerant flows toward the protrusion.

19 Claims, 6 Drawing Sheets

(56) References Cited

U.S. PATENT DOCUMENTS

| | | | | |
|---|---|---|---|---|
| 2005/0236147 | A1* | 10/2005 | Sonoda | F28F 1/126 165/905 |
| 2010/0163210 | A1* | 7/2010 | Kluge | H01L 23/473 174/547 |
| 2012/0235162 | A1 | 9/2012 | Isobe et al. | |
| 2015/0075188 | A1* | 3/2015 | Xu | F25B 9/10 62/6 |
| 2016/0150678 | A1* | 5/2016 | Kim | H01L 23/473 361/699 |
| 2017/0231115 | A1 | 8/2017 | Kobayashi et al. | |
| 2017/0256474 | A1 | 9/2017 | Fujinaga | |

FOREIGN PATENT DOCUMENTS

| | | | |
|---|---|---|---|
| JP | 2003-003248 | A | 1/2003 |
| JP | 2006-336902 | A | 12/2006 |
| JP | 2010-182831 | A | 8/2010 |
| JP | 2012-015240 | A | 1/2012 |
| JP | 2017-143171 | A | 8/2017 |
| WO | 2016/080333 | A1 | 5/2016 |

* cited by examiner

COOLING STRUCTURE

CROSS-REFERENCE TO RELATED APPLICATIONS

This application is a U.S. national phase application filed under 35 U.S.C. § 371 of International Application No. PCT/JP2020/012486, filed Mar. 19, 2020, designating the United States, which claims priority from Japanese Patent Application No. 2019-055695, filed Mar. 22, 2019, the entire contents of each of which are hereby incorporated herein by reference.

TECHNICAL FIELD

The present invention relates to a cooling structure.

BACKGROUND ART

A vehicle equipped with a motor, such as a hybrid car or an electric car is equipped with a driving means that drives the motor. The driving means includes electronic components such as a power module including a plurality of power semiconductors such as an insulated gate bipolar transistor (IGBT), and a capacitor, and a bus bar electrically joining these electronic components.

When the motor is driven, a large current may flow through the power semiconductor, the capacitor, and the bus bar joining these electronic components. In this case, the driving means generates heat due to switching loss, resistance loss, or the like, and therefore needs to be cooled efficiently.

As a cooling means for cooling the driving means, a heat sink including a metal such as aluminum or copper is used because of its high thermal conductivity (see, for example, Patent Literature 1).

CITATION LIST

Patent Literature

Patent Literature 1: Japanese Patent Application Laid-Open (JP-A) No. 2010-182831

SUMMARY OF INVENTION

Technical Problem

In a case in which a heat sink through which a refrigerant flows is provided immediately below an electronic component such as a power semiconductor or a capacitor to cool the electronic component, it is conceivable that a side surface of the electronic component is also cooled. For example, it is conceivable that a path through which the refrigerant flows protrudes vertically upward, a protrusion whose side surface is adjacent to the electronic component is provided, a heat sink is also provided on the side surface of the protrusion, and the refrigerant is supplied.

However, there is a problem that the refrigerant supplied to the protrusion easily accumulates.

An aspect of the present invention has been made in view of the above conventional circumstances, and an object of the present invention is to provide a cooling structure in which occurrence of accumulation in a protrusion is suppressed.

Solution to Problem

Specific means for achieving the above-mentioned problems are as follows.

<1> A cooling structure, comprising:

a flow path configuration member made of resin and forming a flow path through which a refrigerant flows, wherein:

the flow path includes a protrusion that protrudes in a direction outside of the flow path from an inner wall at an upstream side in a direction in which the refrigerant flows, and a rectifier that rectifies the direction in which the refrigerant flows toward the protrusion.

<2> The cooling structure according to <1>, wherein an end of the rectifier at a protrusion side protrudes from the inner wall at the upstream side in the direction outside of the flow path.

<3> The cooling structure according to <1> or <2>, wherein a ratio (h/w) of a height h of the rectifier in the direction outside of the flow path, to a width w of the flow path upstream of the protrusion in the direction outside of the flow path, is 0.5 or more.

<4> The cooling structure according to any one of <1> to <3>, wherein the protrusion protrudes in the direction outside of the flow path from the inner wall of the flow path downstream of the protrusion in the direction in which the refrigerant flows.

<5> The cooling structure according to any one of <1> to <4>, further comprising a cooling target disposed to face at least a part of an inner wall of the protrusion, wherein the cooling target is cooled by the refrigerant flowing through the protrusion.

<6> The cooling structure according to any one of <1> to <5>, wherein the flow path configuration member has an outer wall that is at least partially provided with a metal layer.

<7> The cooling structure according to <5>, wherein:

the flow path configuration member has an outer wall that is at least partially provided with a metal layer, at least a part of the metal layer is provided between the cooling target and the flow path configuration member, and the metal layer is in contact with at least a part of the cooling target.

<8> The cooling structure according to <6> or <7>, wherein the metal layer includes a sprayed metal layer.

Advantageous Effects of Invention

An aspect of the present invention can provide a cooling structure in which accumulation in a protrusion is suppressed.

DESCRIPTION OF EMBODIMENTS

<Cooling Structure>

Figure 1:
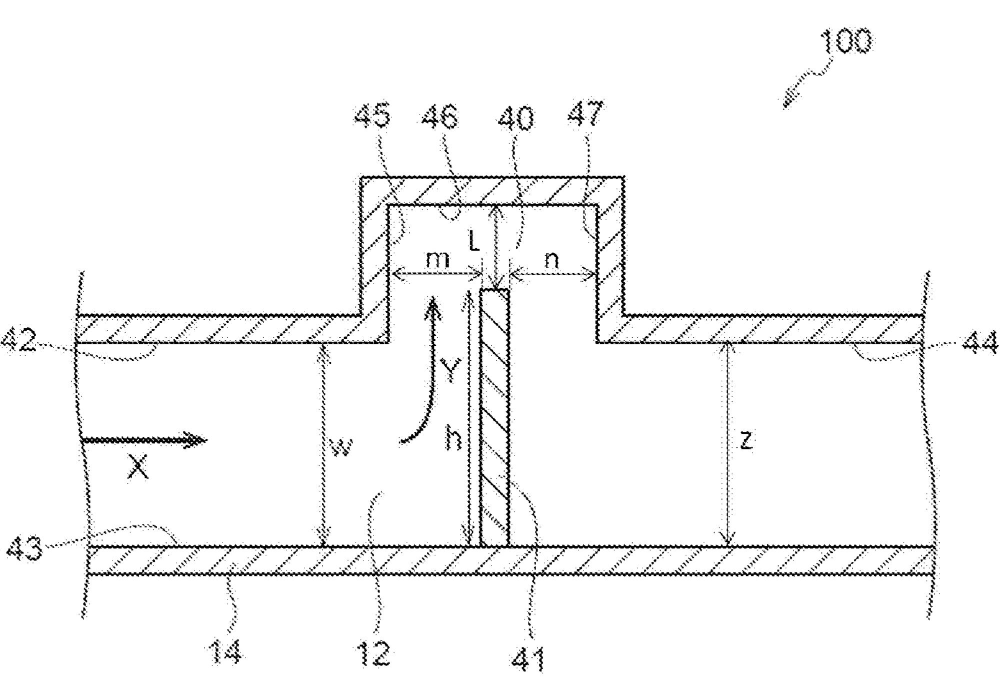
FIG. 1 is a schematic sectional view of an embodiment of a cooling structure.

A cooling structure of the present disclosure includes a flow path configuration member made of resin and forming a flow path through which a refrigerant flows, in which the flow path includes a protrusion that protrudes in a direction outside of the flow path from an inner wall at an upstream side in a direction in which the refrigerant flows, and a rectifier that rectifies the direction in which the refrigerant flows toward the protrusion. The cooling structure of the disclosure includes the protrusion that protrudes in the direction outside of the flow path and the rectifier that rectifies the direction in which the refrigerant flows toward the protrusion. It is therefore considered that a flow of the refrigerant is formed in the protrusion, the refrigerant supplied to the protrusion is less likely to accumulate, and occurrence of accumulation of the refrigerant in the protrusion for a long period of time is suppressed. In addition, it is considered that since the occurrence of accumulation in the protrusion is suppressed, cooling efficiency in the protrusion is enhanced.

Hereinafter, the cooling structure of the disclosure will be described with reference to the drawings. Note that sizes of members in the drawings are conceptual, and a relative relationship between the sizes of the members is not limited to the relationship disclosed herein. In addition, members having substantially the same functions are denoted by the same reference signs throughout the drawings, and redundant description may be omitted.

Figure 2:
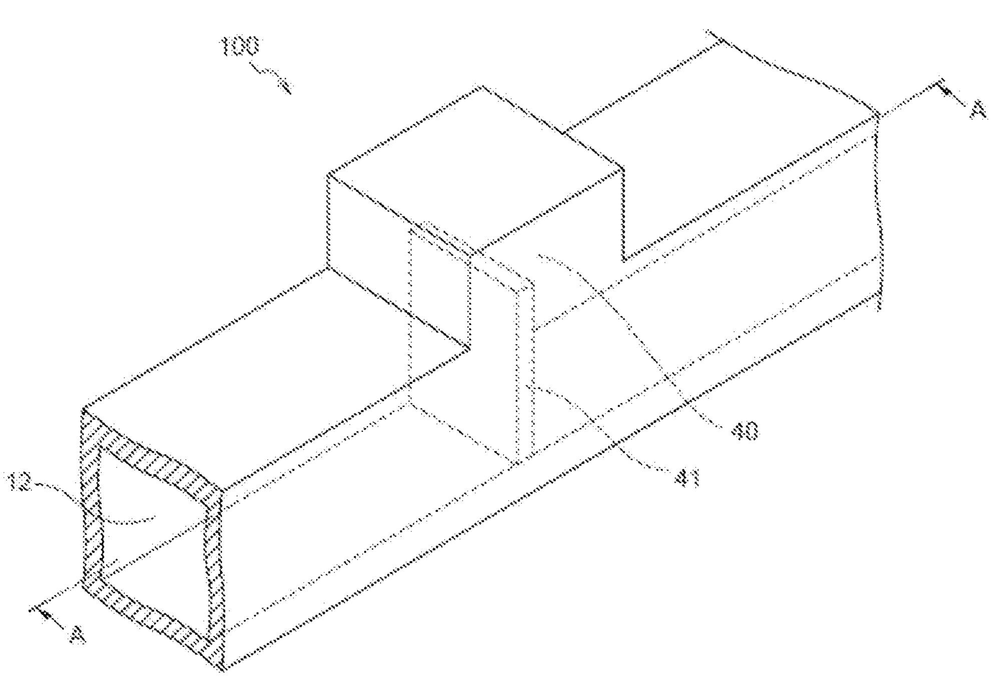
FIG. 2 is a schematic view of an embodiment of the cooling structure.

A cooling structure 100 illustrated in FIGS. 1 and 2 includes a flow path configuration member 14 that is made of resin and forms a flow path 12 through which a refrigerant flows. FIG. 1 is a sectional view taken along a vertical plane including line AA illustrated in FIG. 2. The flow path may have a substantially rectangular cross section in a direction orthogonal to the direction in which the refrigerant flows as illustrated in FIGS. 1 and 2, or may have a circular cross section, an elliptical cross section, a polygonal cross section other than a rectangular cross section, or the like.

The flow path 12 includes a protrusion 40 that protrudes in a vertical upward direction in the direction in which the refrigerant flows (a direction of an arrow X in FIG. 1), and a rectifier 41 that rectifies the direction in which the refrigerant flows toward the protrusion 40.

The protrusion 40 is formed between an upper inner wall 42 at an upstream side and an upper inner wall 44 at a downstream side in the direction in which the refrigerant flows. An end of the rectifier 41 at the protrusion 40 side protrudes in the vertical upward direction from the upper inner wall 42 at the upstream side and the upper inner wall 44 at the downstream side.

The protrusion 40 includes side inner walls 45 and 47 and an upper inner wall 46, and has a rectangular cross section in a direction parallel to the direction in which the refrigerant flows. In the direction in which the refrigerant flows, the side inner wall 45 is a wall surface upstream of the side inner wall 47, and the side inner wall 47 is a wall surface downstream of the side inner wall 45. The protrusion may have cross sections that are each independently a circular, elliptical, or polygonal in the direction parallel to the direction in which the refrigerant flows.

The protrusion may have a rectangular cross section orthogonal to the direction in which the refrigerant flows as illustrated in FIG. 2, or may have a cross section that is circular, elliptical, polygonal other than rectangular, or the like.

Note that the protrusion only needs to protrude in the direction outside of the flow path from the inner wall at the upstream side in the direction in which the refrigerant flows, and is not limited to the configuration in which the protrusion protrudes in the vertical upward direction from the upper inner wall at the upstream side. For example, the protrusion may protrude vertically downward from a lower inner wall at the upstream side, or may protrude in the direction outside of the flow path of the side inner wall from the side inner wall at the upstream side.

In the disclosure, the "direction outside of the flow path" means a direction from the inner wall of the flow path toward outside of the flow path configuration member via the outer wall.

The rectifier 41 extends from the lower inner wall 43 toward inside of the flow path 12. The rectifier 41 rectifies the direction in which the refrigerant flows toward the protrusion 40, for example, to an extending direction of the rectifier 41 (a direction of an arrow Y in FIG. 1). The rectifier 41 has a plate structure extending from at least a part of a portion of the lower inner wall 43 facing the upper inner wall 46 in the protrusion 40 toward the protrusion 40.

A material configuring the rectifier 41 may be a resin configuring the flow path configuration member 14 to be described later, or may be a metal configuring a heat diffuser to be described later.

The end of the rectifier 41 at the protrusion 40 protrudes in the vertical upward direction as the direction outside of the flow path from the upper inner wall 42 at the upstream side. As a result, a flow of the refrigerant is suitably formed on a side of the protrusion 40, and the refrigerant supplied to the protrusion 40 is less likely to accumulate.

The rectifier is not limited as long as the rectifier rectifies the direction in which the refrigerant flows toward the protrusion. For example, the rectifier may extend toward the protrusion from at least a part of a portion of an inner wall of the flow path configuration member facing the inner wall of the protrusion in the direction outside of the flow path.

A ratio ($L/w$) of a distance $L$ between the upper inner wall 46 of the protrusion 40 and a wall surface of the rectifier 41 facing the upper inner wall 46 to a width $w$ of the flow path 12 upstream of the protrusion 40 in the vertical upward direction as the direction outside of the flow path is preferably 1 or more, and more preferably $L/w=1$, that is, $L=w$.

Further, a ratio ($z/w$) of the width $z$ of the flow path 12 downstream of the protrusion 40 in the vertical upward direction as the direction outside of the flow path to the width $w$ is preferably 1 or more, and more preferably $z/w=1$, that is, $z=w$.

A ratio ($m/w$) of a distance $m$ between the side inner wall 45 of the protrusion 40 and a wall surface of the rectifier 41 facing the side inner wall 45 to a width $w$ of the flow path 12 upstream of the protrusion 40 in the vertical upward direction as the direction outside of the flow path is preferably 1 or more, and more preferably $m/w=1$, that is, $m=w$.

A ratio ($n/w$) of a distance $n$ between the side inner wall 47 of the protrusion 40 and a wall surface of the rectifier 41 facing the side inner wall 47 to a width $w$ of the flow path 12 upstream of the protrusion 40 in the vertical upward direction as the direction outside of the flow path is preferably 1 or more, and more preferably $n/w=1$, that is, $n=w$.

A ratio ($h/w$) of a height $h$ of the rectifier 41 in the vertically upward direction as the direction outside of the flow path to the width $w$ is preferably 0.5 or more, and more preferably 1 or more.

Figure 3:
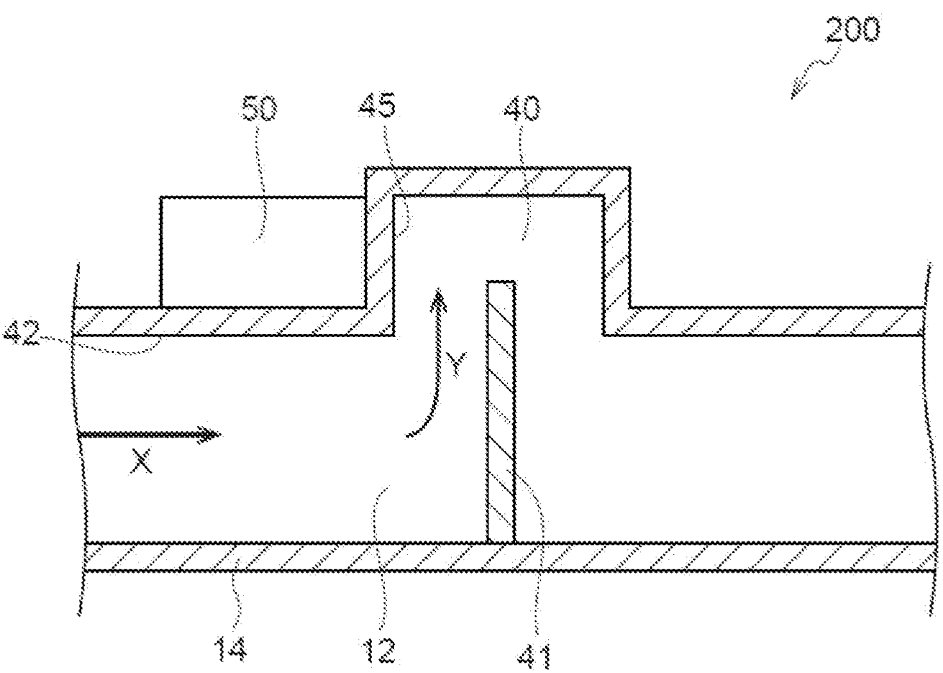
FIG. 3 is a schematic sectional view of an embodiment of the cooling structure in which a cooling target is disposed.

FIG. 3 is a schematic sectional view of an embodiment of the cooling structure in which a cooling target is disposed.

A cooling structure 200 illustrated in FIG. 3 has a configuration in which a cooling target 50 is disposed so as to face the upper inner wall 42 at the upstream side and the side inner wall 45 of the protrusion, and the cooling target 50 is cooled by the refrigerant flowing through the protrusion 40.

Examples of the cooling target 50 include electronic components such as a power semiconductor and a capacitor.

The cooling target 50 may include a heat sink (not illustrated) extending from the upper inner wall 42 at the upstream side toward inside of the flow path 12, and a heat sink (not illustrated) extending from the side inner wall 45 toward the protrusion 40.

In a case in which the cooling structure 200 includes the heat sink, an insulating substrate, an insulating sheet, or the like that transfers heat generated by the cooling target 50 to the heat sink may be provided between the cooling target 50 and the heat sink. Alternatively, a part of the heat sink may be embedded in the flow path configuration member 14, and the heat generated by the cooling target 50 may be transferred to the heat sink via the flow path configuration member 14 without the heat sink and the cooling target 50 being in contact with each other.

The heat sink may include, for example, the heat diffuser having a plate shape and facing a bottom of the cooling target 50 and a cooling fin extending from a surface of the heat diffuser on a side of the upper inner wall 42 at the upstream side into the flow path 12. The heat sink may include a heat diffuser having a plate shape and facing a side surface of the cooling target 50, and a cooling fin extending from a surface of the heat diffuser at a side of the side inner wall 45 to the protrusion 40.

The heat diffuser preferably is made of metal, and at least a surface of the cooling fin preferably is made of resin. As a result, the heat diffused in a plane direction by the heat diffuser having high thermal conductivity is easily dissipated by the cooling fin.

The cooling fin need not reach the lower inner wall 43 from the upper inner wall 42 at the upstream side, and a distal end of the cooling fin may be located in the flow path 12. The distal end of the cooling fin may be in contact with the lower inner wall 43 in terms of increasing an amount of the refrigerant in contact with the cooling fin to enhance the cooling efficiency of the cooling structure 200. In addition, in a case in which the distal end of the cooling fin is in contact with the lower inner wall 43, for example, when a load is applied from the upper inner wall 42 at the upstream side toward the lower inner wall 43 (alternatively, from the lower inner wall 43 toward the upper inner wall 42 at the upstream side), a strength of the cooling structure 200 can be increased.

From the side inner wall 45 at the cooling target 50, the distal end of the cooling fin may reach or need not reach the other side inner wall 47.

At least the surface of the cooling fin preferably is made of resin. The entire cooling fin may be made of resin, or the cooling fin may include a metal rod-shaped core material. When the cooling fin includes a rod-shaped core material, a surface of the metal core material is preferably covered with resin in terms of suppressing corrosion and the like. One end of the core material may be connected to the heat diffuser in terms of improving the cooling efficiency.

Modification of Cooling Structure

In a modification of the cooling structure according to the disclosure, a metal layer is provided on at least a part of the outer wall of the flow path configuration member, at least a part of the metal layer is preferably provided between the flow path configuration member and a power semiconductor, a capacitor, or the like as the cooling target, and the metal layer is in contact with at least a part of the cooling target. Since at least a part of the cooling target is in contact with the metal layer, the heat generated in the cooling target moves to the refrigerant flowing through the flow path via the metal layer, and thus the cooling target can be efficiently cooled.

Figure 4:
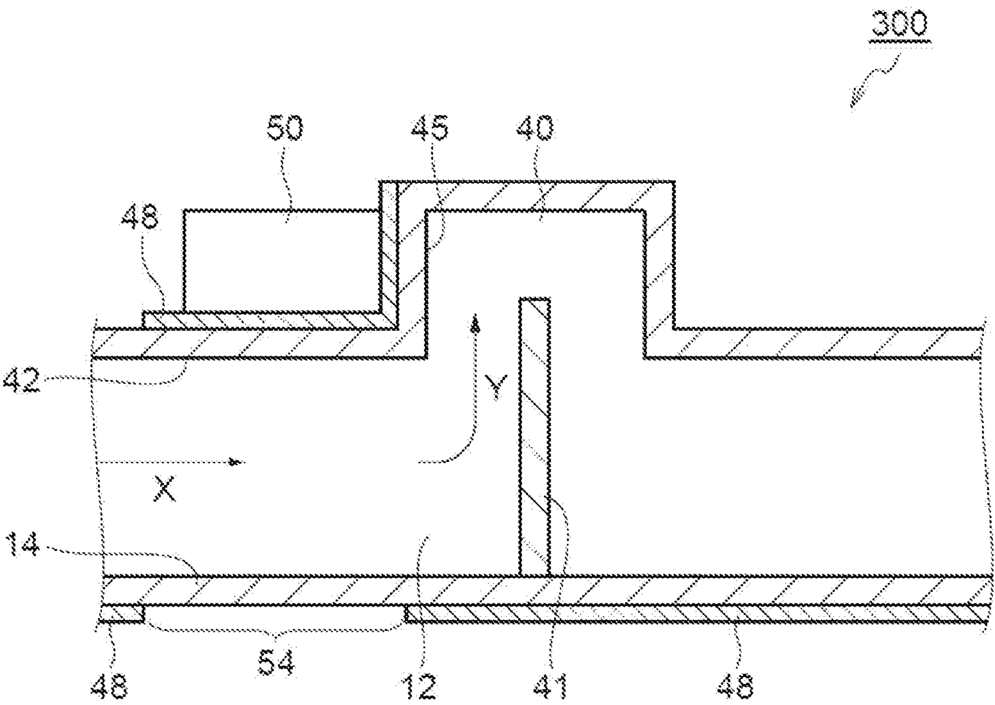
FIG. 4 is a schematic sectional view of a modification of the cooling structure.

Hereinafter, the modification of the cooling structure according to the disclosure will be described with reference to FIG. 4. FIG. 4 is a schematic sectional view illustrating the modification of the cooling structure. FIG. 4 illustrates a cross section of a cooling structure 300, parallel to the direction in which the refrigerant flows through the flow path 12.

In the cooling structure 300 illustrated in FIG. 4, the cooling target 50 is in contact with the flow path configuration member 14 with the metal layer 48 provided on the outer wall of the flow path configuration member 14 interposed therebetween.

The heat generated from the cooling target 50 reaches the outer wall of the flow path configuration member 14 via the metal layer 48, and the heat further reaching the upper inner wall 42 at the upstream side and the side inner wall 45 of the protrusion moves to the cooling fin (not illustrated). At this time, the heat is transferred from the cooling fins to the refrigerant by the refrigerant flowing through the flow path 12. Since the cooling target 50 is in contact with the flow path configuration member 14 via the metal layer 48, the heat generated from the cooling target 50 is likely to efficiently move to the cooling fin, and the cooling efficiency is improved.

In addition, the metal layer 48 can shield a magnetic field in a low frequency range (in particular, a radio band) generated from the cooling target 50. It is therefore effective to provide the metal layer 48 on the outer wall of the flow path configuration member 14 in terms of magnetic field shielding. The metal layer 48 only has to be provided on at least a part of the outer wall of the flow path configuration member 14. Note that, the metal layer 48, which is conductive, does not have to be provided at a portion where insulating properties are required. In addition, the metal layer 48 may be formed on the outer wall of the flow path configuration member 14, and the metal layer 48 at the portion where insulating properties are required may be covered with a resin layer.

The metal layer 48 is preferably provided, for example, on the outer wall of the flow path configuration member 14 opposite to a side on which the cooling target 50 is disposed. Further, as shown in FIG. 4, in a case in which the metal layer 48 is provided on a part of the outer wall of the flow path configuration member 14 on the side where the cooling target 50 is disposed, a region 54 where the metal layer 48 is not provided may exist on the outer wall of the flow path configuration member 14 opposite to the side on which the cooling target 50 is disposed.

A method of manufacturing the cooling structure according to the disclosure is not limited, and it is possible to adopt a usual method of molding a resin molded body such as an injection molding method, a die slide injection molding method, a blow molding method, a compression molding method, a transfer molding method, an extrusion molding method, or a cast molding method. Note that the die slide injection molding method is preferable because high positional accuracy may be required for manufacturing the cooling structure 100. In addition, in a case in which the rectifier is configured with the same resin as the flow path configuration member, the rectifier can be integrally molded with the flow path configuration member, and the manufacturing of the cooling structure can be simplified.

The types of the resins configuring the flow path configuration member 14 and the cooling fin are not limited. Examples of the resin include a polyethylene-based resin, a polypropylene-based resin (PP), a composite polypropylene-based resin (PPC), a polyphenylene sulfide-based resin (PPS), a polyphthalamide-based resin (PPA), a polybutylene terephthalate-based resin (PBT), an epoxy-based resin, a phenol-based resins, polystyrene-based resin, a polyethylene terephthalate-based resin, a polyvinyl alcohol-based resin, a vinyl chloride-based resin, an ionomer-based resin, a polyamide-based resin, an acrylonitrile-butadiene-styrene copolymer resin (ABS), and a polycarbonate-based resin. The resins configuring the flow path configuration member 14 and the resin configuring the cooling fin may be the same or different.

The resins configuring the flow path configuration member 14 and the cooling fin may contain an inorganic filler. Examples of the inorganic filler include silica, alumina, zircon, magnesium oxide, calcium silicate, calcium carbonate, potassium titanate, silicon carbide, silicon nitride, boron nitride, beryllia, and zirconia. Furthermore, examples of the inorganic filler having a flame retardant effect include aluminum hydroxide and zinc borate.

The inorganic fillers included in the resins configuring the flow path configuration member 14 and the cooling fin may be the same or different. One of the resins configuring the flow path configuration member 14 or the resin configuring the cooling fin may include an inorganic filler, and the other does not have to include an inorganic filler.

Examples of the metal configuring the heat diffuser include metals such as aluminum, iron, copper, gold, silver, and stainless steel, and alloys thereof.

The heat diffuser may have a mesh shape, a punching metal, or the like in terms of suppressing a load on the cooling structure 200 due to a difference in thermal expansion coefficient between the resins configuring the flow path configuration member 14 and the cooling fin and the metal configuring the heat diffuser.

The type of the refrigerant flowing through the flow path is not limited. Examples of the refrigerant include a liquid such as water and an organic solvent, and a gas such as air. The water used as the refrigerant may include a component such as an antifreeze liquid.

The component configuring the metal layer is not limited, and examples thereof include zinc, aluminum, a zinc-aluminum alloy, carbon steel, stainless steel, nickel, a nickel alloy, tin, copper, a copper alloy, silver, a silver alloy, gold, a gold alloy, and molybdenum. Among these components, silver and copper are preferable in terms of enhancing a magnetic field shielding effect. On the other hand, silver and gold are preferable in terms of the cooling efficiency of the cooling target.

A method of forming the metal layer is not limited, and examples thereof include electrolytic plating, electroless plating, vapor deposition, attachment of a metal plate, and metal spraying. The metal layer is preferably a sprayed metal layer formed by a metal thermal spraying method in terms of formability, and is preferably zinc in terms of workability.

An average thickness of the metal layer 48 is not limited, and is preferably from 1 μm to 2 mm.

An average thickness of the metal layer in contact with the cooling target is preferably from 200 μm to 2 mm, and more preferably from 500 μm to 2 mm in terms of the cooling efficiency.

The average thickness of the metal layer provided on the outer wall of the flow path configuration member 14 on the side opposite to the side where the cooling target is disposed is preferably from 1 μm to 2 mm, preferably from 200 μm to 2 mm, and more preferably from 500 μm to 2 mm in terms of magnetic field shielding.

The cooling structure may include a temperature sensor that measures temperature of the refrigerant, and may include a temperature sensor downstream of the region in which the protrusion and the rectifier are provided in the flow path. In addition, the amount of the refrigerant may be adjusted in accordance with the temperature of the temperature sensor, or a controller may be provided that adjusts the amount of refrigerant in accordance with the temperature of the temperature sensor.

The cooling structure according to the disclosure is effective for cooling electronic components such as a power module including a plurality of power semiconductors, and a capacitor, and a bus bar electrically joining these electronic components in a vehicle equipped with a motor such as a hybrid vehicle or an electric vehicle.

EXAMPLE

Hereinafter, magnetic field shielding performance and cooling performance of the metal layer are studied on the basis of an experimental example.

Evaluation of Magnetic Field Shielding Performance

A PPS resin plate having a length of 120 mm, a width of 120 mm, and a thickness of 5 mm was prepared and used as a test piece 1.

A zinc layer having an average thickness of 200 μm was formed on one surface of the test piece 1 by a thermal spraying method. This was used as a test piece 2.

An aluminum plate having a length of 120 mm, a width of 120 mm, and a thickness of 500 μm was used as a test piece 3.

For the test piece 1, the test piece 2, and the test piece 3, the magnetic field shielding performance was evaluated by an apparatus for evaluating a magnetic field shielding effect in a KEC method (from 500 Hz to 1 GHz) described below.

Figure 5:
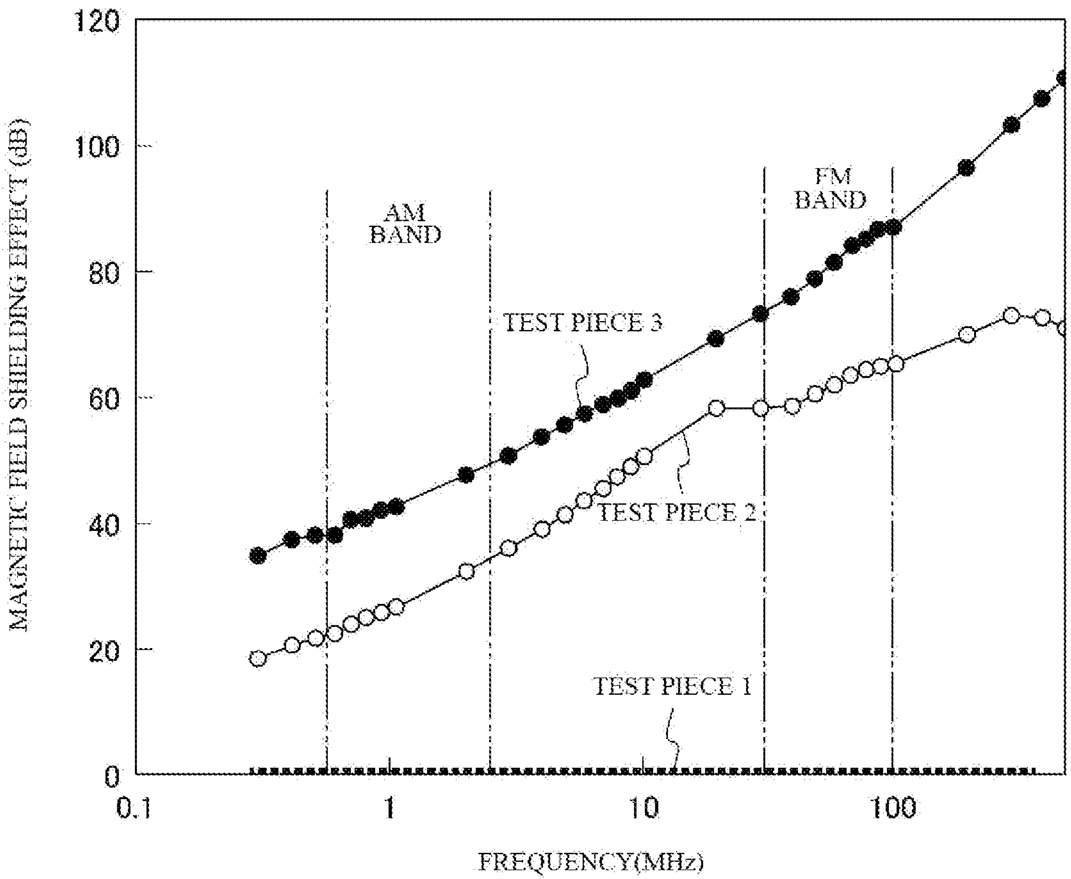
FIG. 5 is a diagram illustrating evaluation results of magnetic field shielding performance of a metal layer.

The obtained results are shown in FIG. 5. As is clear from FIG. 5, it can be seen that the test piece 2 and the test piece 3 show a more excellent magnetic field shielding effect than the test piece 1.

Evaluation of Cooling Performance

A channel model 1 having a rectangular cross section with an outer diameter of 30 mm (width)×15 mm (length), an inner diameter of 25 mm (width)×10 mm (length), and a length of 110 mm was formed with use of a PPS resin. A zinc layer 48 having an average thickness of 200 μm was formed on an upper surface of an outer wall of 110 mm×30 mm of the channel model 1 by the thermal spraying method. This was defined as a channel model 2.

Figure 6:
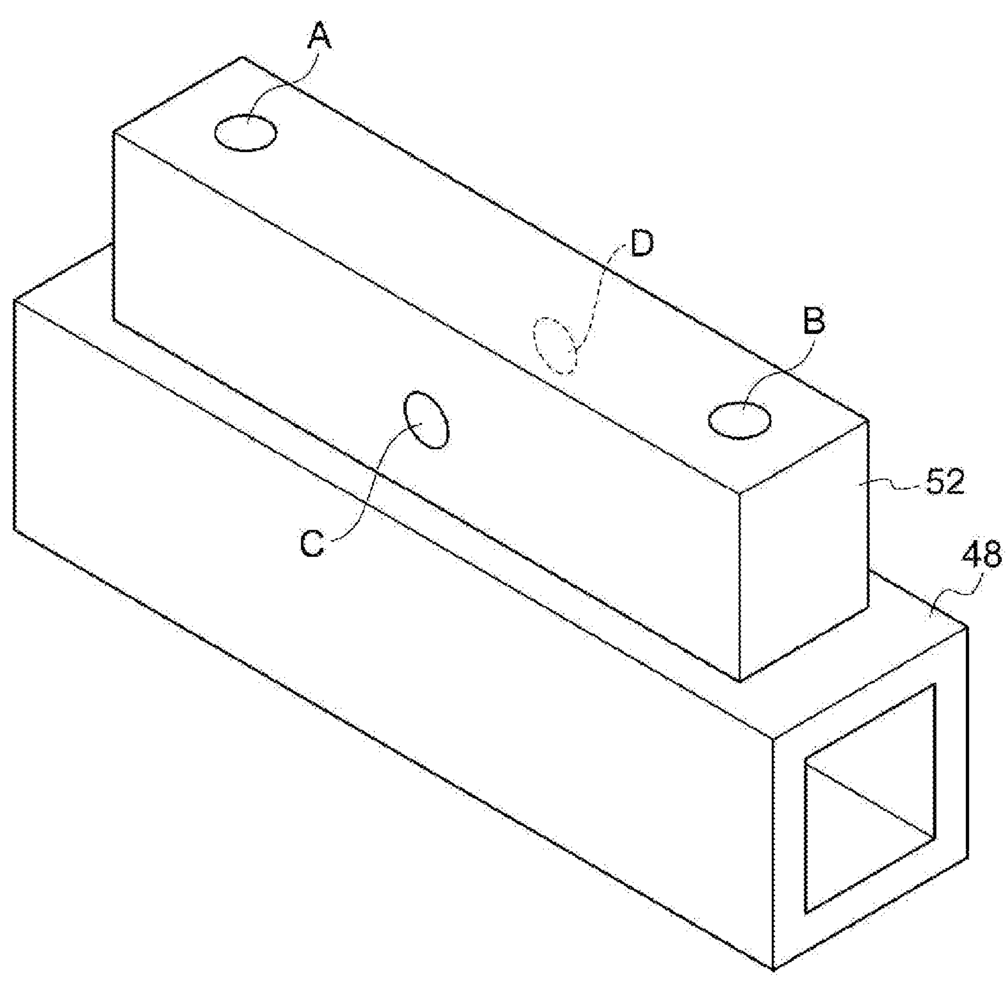
FIG. 6 is a diagram for describing a method of evaluating cooling performance.

On each of the outer wall of 110 mm×30 mm of the channel model 1 and the surface on which the zinc layer 48 of the water channel model 2 was formed, an iron block 52 having a size of 95 mm×25 mm×15 mm and heated to 100° C. was disposed as shown in FIG. 6, and water at 20° C. was circulated in each channel model at a flow rate of 8 L/min.

Temperature changes at a total of four points A to D shown in FIG. 6 were measured with a high-performance recorder GR-3500 manufactured by KEYENCE CORPORATION immediately after the iron block 52 was disposed. As a result, the temperature at each measurement point 17 minutes after the iron block 52 was disposed was as shown in Table 1 below, and it became clear that the zinc layer 48 was effective for cooling the cooling target.

TABLE 1

| | | Temperature after 10 minutes |
|---|---|---|
| Channel Model 1 | A | 69.2° C. |
| | B | 69.3° C. |
| | C | 68.7° C. |
| | D | 67.4° C. |
| Channel Model 2 | A | 38.9° C. |
| | B | 40.2° C. |
| | C | 39.0° C. |
| | D | 38.4° C. |

The disclosure of Japanese Patent Application No. 2019-055695 filed on Mar. 22, 2019 is incorporated herein by reference in its entirety.

All documents, patent applications, and technical standards described herein are incorporated herein by reference to the same extent as in a case in which each document, patent application, and technical standard are specifically and individually indicated to be incorporated by reference.

REFERENCE SIGNS LIST

12 Flow path
14 Flow path configuration member
40 Protrusion
41 Rectifier
42 Upper inner wall at upstream side
43 Lower inner wall
44 Upper inner wall at downstream side
45, 47 Side inner wall
46 Upper inner wall
48 Metal layer
50 Cooling target
52 Iron block
54 Region
100, 200, 300 Cooling structure

The invention claimed is:

1. A cooling structure, comprising:

a flow path configuration member made of resin and forming a flow path through which a refrigerant flows, wherein the flow path includes a protrusion that protrudes in a direction outside of the flow path from an inner wall at an upstream side in a direction in which the refrigerant flows, and a rectifier that rectifies the direction in which the refrigerant flows toward the protrusion;

a cooling target disposed on a part of an outer wall on a side of the flow path configuration member to directly or indirectly contact a wall of the flow path configuration member at an upstream side of the protrusion and to directly or indirectly contact at least a part of a side wall of the protrusion so that the cooling target can be cooled by refrigerant flowing through the protrusion;

a metal layer provided on at least a part of an outer wall of the flow path configuration member on a side of the flow path configuration member opposite to the side on which the cooling target is disposed, wherein the metal layer includes zinc and is configured to shield a magnetic field generated from the cooling target; and a further metal layer provided on at least a part of the outer wall of the flow path configuration member between the cooling target and the flow path configuration member, wherein the cooling target is in indirect contact with the wall of the flow path configuration member at an upstream side of the protrusion and with at least a part of the side wall of the protrusion via the further metal layer, and wherein the further metal layer is in contact with at least a part of the cooling target.

2. The cooling structure according to claim 1, wherein an end of the rectifier at a protrusion side protrudes from the inner wall at the upstream side in the direction outside of the flow path.

3. The cooling structure according to claim 2, wherein a ratio (h/w) of a height h of the rectifier in the direction outside of the flow path, to a width w of the flow path upstream of the protrusion in the direction outside of the flow path, is 0.5 or more.

4. The cooling structure according to claim 2, wherein the protrusion protrudes in the direction outside of the flow path from the inner wall of the flow path downstream of the protrusion in the direction in which the refrigerant flows.

5. The cooling structure according to claim 2, further comprising a further metal layer provided on at least a part of the outer wall of the flow path configuration member between the cooling target and the flow path configuration member, wherein the further metal layer is in contact with at least a part of the cooling target.

6. The cooling structure according to claim 1, wherein a ratio (h/w) of a height h of the rectifier in the direction outside of the flow path, to a width w of the flow path upstream of the protrusion in the direction outside of the flow path, is 0.5 or more.

7. The cooling structure according to claim 6, wherein the protrusion protrudes in the direction outside of the flow path from the inner wall of the flow path downstream of the protrusion in the direction in which the refrigerant flows.

8. The cooling structure according to claim 6, further comprising a further metal layer provided on at least a part of the outer wall of the flow path configuration member between the cooling target and the flow path configuration member, wherein the further metal layer is in contact with at least a part of the cooling target.

9. The cooling structure according to claim 1, wherein the protrusion protrudes in the direction outside of the flow path from the inner wall of the flow path downstream of the protrusion in the direction in which the refrigerant flows.

10. The cooling structure according to claim 1, wherein the metal layer includes a sprayed metal layer.

11. The cooling structure according to claim 1, wherein the metal layer is a zinc layer.

12. The cooling structure according to claim 11, wherein the metal layer has an average thickness from 1 μm to 2 mm.

13. The cooling structure according to claim 11, wherein the metal layer has an average thickness from 200 μm to 2 mm.

14. The cooling structure according to claim 11, wherein the metal layer has an average thickness from 500 μm to 2 mm.

15. The cooling structure according to claim 1, wherein the metal layer has an average thickness from 1 μm to 2 mm.

16. The cooling structure according to claim 1, wherein the metal layer has an average thickness from 200 μm to 2 mm.

17. The cooling structure according to claim 1, wherein the metal layer has an average thickness from 500 μm to 2 mm.

18. The cooling structure according to claim 1, wherein the cooling target includes a power semiconductor or a capacitor.

19. The cooling structure, comprising:

a flow path configuration member made of resin and forming a flow path through which a refrigerant flows, wherein the flow path includes a protrusion that protrudes in a direction outside of the flow path from an inner wall at an upstream side in a direction in which the refrigerant flows, and a rectifier that rectifies the direction in which the refrigerant flows toward the protrusion;

a cooling target disposed on a part of an outer wall on a side of the flow path configuration member to directly or indirectly contact a wall of the flow path configuration member at an upstream side of the protrusion and to directly or indirectly contact at least a part of a side wall of the protrusion so that the cooling target can be cooled by refrigerant flowing through the protrusion; and a metal layer provided on at least a part of an outer wall of the flow path configuration member on a side of the flow path configuration member opposite to the side on which the cooling target is disposed, wherein the metal layer includes zinc and is configured to shield a magnetic field generated from the cooling target, wherein the cooling target is in direct contact with the wall of the flow path configuration member at an upstream side of the protrusion and with at least a part of the side wall of the protrusion.

* * * * *